(12) United States Patent
Nishide

(10) Patent No.: US 7,565,670 B2
(45) Date of Patent: Jul. 21, 2009

(54) DISK CLAMPING MECHANISM HAVING IMPROVED VIBRATION RESISTANCE

(75) Inventor: Masahiko Nishide, Echizen (JP)

(73) Assignee: Orion Electric Co., Ltd., Echizen (JP)

( * ) Notice: Subject to any disclaimer, the term of this patent is extended or adjusted under 35 U.S.C. 154(b) by 441 days.

(21) Appl. No.: 11/434,201

(22) Filed: May 16, 2006

(65) Prior Publication Data

US 2006/0268454 A1  Nov. 30, 2006

(30) Foreign Application Priority Data

May 31, 2005   (JP)   ............................. 2005-159920

(51) Int. Cl.
*G11B 17/03*  (2006.01)
(52) U.S. Cl. .................................... 720/706
(58) Field of Classification Search ................ 720/706, 720/707
See application file for complete search history.

(56) References Cited

U.S. PATENT DOCUMENTS 5,050,159 A * 9/1991 Kenmotsu .................... 720/704
5,732,064 A * 3/1998 Huang ......................... 720/611
2003/0133399 A1 * 7/2003 Chuang et al. .............. 369/270

FOREIGN PATENT DOCUMENTS

| JP | 2-118953 | 5/1990 |
|----|----------|--------|
| JP | 11-031350 A | 2/1999 |
| JP | 2004-13939 | 1/2004 |

OTHER PUBLICATIONS

Japanese Office Action dated Aug. 5, 2008, issued in corresponding Japanese Patent Application No. 2005-159920.

* cited by examiner

*Primary Examiner*—David D Davis
(74) *Attorney, Agent, or Firm*—Westerman, Hattori, Daniels & Adrian, LLP.

(57) ABSTRACT

The invention provides an electronic device with a recording and/or reproducing apparatus having a claming mechanism having superior vibration resistance, capable of securely supporting the disk clamped via a clamper and a turntable. The electronic device according to the present invention comprises a supporting portion 41 having a retention frame 46 and a screw hole 44, wherein one end of a leaf spring 51 is locked thereto and the other end is screw-engaged thereto so that a depressed portion 51A of the leaf spring 51 is elastically in contact with a projection 32B of the clamper 32, by which the disk D clamped by the clamper 32 and the turntable 12 is biased without fail by the leaf spring 51. Thereby, the present invention enables to provide a clamping mechanism having enhanced vibration resistance.

10 Claims, 10 Drawing Sheets

DISK CLAMPING MECHANISM HAVING IMPROVED VIBRATION RESISTANCE

The present application is based on and claims priority of Japanese patent application No. 2005-159920 filed on May 31, 2005, the entire contents of which are hereby incorporated by reference.

BACKGROUND OF THE INVENTION

1. Field of the Invention

The present invention relates to an electronic device with a recording and/or reproducing apparatus capable of recording or reproducing data on a disk-like recording medium (hereinafter simply referred to as disk), and more specifically, relates to a recording and/or reproducing apparatus and an electronic device with a recording and/or reproducing apparatus that clamps the disk between a clamper and a turntable.

2. Description of the Related Art

Upon recording or reproducing data on a disk in an electronic device with a recording and/or reproducing apparatus, the disk loaded into the device is mounted on a turntable, then the turntable is elevated and the disk is pushed up toward the clamper arranged to face the turntable. Thereby, the center portion of the disk is clamped via the turntable and the clamper, and the disk is revolved via a spindle motor disposed on the turntable so as to write data onto the disk or read data from the disk. At this time, if the disk is clamped in an unstable manner, the disk may vibrate, causing problems such as jumping of audio during reproduction or write error of data to the disk. In order to prevent such problems from occurring, there are demands for a disk clamping mechanism having improved resistance to vibration.

The conventional structures aimed at solving the problem are disclosed in Japanese Patent Application Laid-Open Publication Nos. 2004-13939 and 2-118953 (patent documents 1 and 2), which disclose a structure having a magnetic body disposed on the surface of the turntable and a magnet embedded in the clamper so that the turntable and the clamper are attracted magnetically to one another to clamp the disk, and a structure for clamping the disk via the turntable and the clamper using an elastic body such as a spring.

The clamping mechanism disclosed in patent document 1 includes a leaf spring having one end fixed to a clamp arm and elastically contacted to the upper end of the clamper so as to bias the clamper constantly toward the lower direction, by which the center portion of the disk is clamped by the clamper and the turntable.

Further, the clamping mechanism disclosed in patent document 2 includes a leaf spring having both ends fixed to a clamper holder and elastically contacted to the upper end of the clamper so as to bias the clamper constantly toward the lower direction, by which the center portion of the disk is clamped by the clamper and the turntable.

However, according to the above-described structure having a magnetic body and a magnet disposed on the turntable and the clamper to magnetically attract the turntable and the clamper toward one another to thereby clamp the disk, the clamping by the magnetic attraction may become impossible and cancelled if the vibration of the disk is increased, which may cause drawbacks such as jumping of audio or falling of disk. Moreover, the above structure must have a cover member for preventing the magnet from falling from the clamper, by which the number of necessary components and the number of manufacturing steps are increased. Even further, since a magnet which is a relatively expensive component is included in the device, it is difficult to cut down the costs of the device.

Moreover, according to the electronic device with a recording and/or reproducing apparatus disclosed in patent document 1, a leaf spring having one end fixed to the clamp arm is used for pressing the clamper, but since only one end of the leaf spring is fixed, the leaf spring tended to deform easily, making it difficult to constantly press the clamper in a uniform manner by the leaf spring, and the defective fraction of the device during the production process was high.

On the other hand, according to the electronic device with a recording and/or reproducing apparatus of patent document 2, since both ends of the leaf spring are fixed to the clamper holder via screws and the like, the leaf spring tends to apply a strong pressure when the clamper and the turntable clamp the disk, putting too much load on the spindle motor for driving the turntable, and it was troublesome to design the leaf spring to have suitable spring pressure.

SUMMARY OF THE INVENTION

The present invention aims at solving the problems of the prior art mentioned above by providing a recording and/or reproducing apparatus and an electronic device with a recording and/or reproducing apparatus capable of constantly clamping the disk with appropriate pressure via a clamper by an elastic member, and capable of securely and stably clamping the disk, that can be manufactured at a low cost.

According to a first aspect of the present invention, a recording and/or reproducing apparatus having a turntable and a clamper holding a disk therebetween to write data into the disk or read data from the disk comprises a tray for mounting a disk; a frame for supporting the tray in a slidable manner; a turntable disposed on the frame for rotating the disk; and a clamper disposed on the frame so as to oppose to the turntable and enabled to move up and down; wherein the clamper further comprises an elastic body for biasing the clamper toward the turntable, at least one end of the elastic body being fixed to the frame and being supported on the frame in a cantilever form; and the frame further comprises a locking portion for preventing uplift of the elastic body.

According to the arrangement of the recording and/or reproducing apparatus of aspect 1, upon holding the disk between the turntable and the clamper, at least one end of the elastic body is fixed to the frame, while the other end is supported via a locking portion that suppresses uplift of the elastic body by which the elastic body is fixed to the frame and biased toward the clamper, so that an appropriate load can be applied constantly to the clamper when the turntable and the clamper hold the disk.

A second aspect of the present invention provides a recording and/or reproducing apparatus according to aspect 1, wherein the elastic body is composed of a leaf spring having one end of thereof fixed to the frame via a fixing means, the frame further comprising as the locking portion a retention frame for preventing uplift of the leaf spring by having the other end of the leaf spring inserted thereto and a stopper for supporting said other end of the leaf spring.

According to the arrangement of aspect 2, the elastic body being fixed to the frame is a leaf spring, and one end of the leaf spring is fixed to the frame via a fixing means while the other end thereof is fixed by inserting to the retention frame, so that the arrangement provides appropriate biasing force to the clamper elastically in contact with the leaf spring and supporting the disk with the turntable, restricting the movement of the leaf spring caused by the vibration of the disk and reducing the contact noise generated between the leaf spring and the frame.

A third aspect of the present invention provides a recording and/or reproducing apparatus according to aspects 1 or 2, wherein the fixing means is composed of a screw, and the frame has a screw hole for receiving the screw.

According to the arrangement of aspect 3, the fixing means is a screw and screw holes are formed to the frame and the leaf spring, so that one end of the leaf spring can be fixed securely to the frame without the need for a position determining step.

A fourth aspect of the present invention provides a recording and/or reproducing apparatus according to aspects 1 or 2, wherein the fixing means is composed of a protruded portion and a position restricting rib formed to the frame, having one end of the leaf spring inserted to a groove portion formed between the protruded portion and the position restricting rib, and wherein the leaf spring further has a locking claw that restricts the spring from escaping from the groove portion.

According to the arrangement of aspect 4, the fixing means is composed of a protruded portion and a position restricting rib formed to the frame, and the leaf spring has a locking claw, so that one end of the leaf spring can be inserted to the retention frame until it reaches a position where the spring is stopped by the position restricting rib, at which position the locking claw is locked onto the protruded portion, so the leaf spring can be easily assembled onto the frame.

A fifth aspect of the present invention relates to a recording and/or reproducing apparatus according to any one of aspects 2 through 4, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection.

According to the arrangement of aspect 5, the clamper biased by the leaf spring is supported in the opening formed to the frame via a hook portion in a manner so as to be able to move up and down, having a flange portion elastically in contact with the disk and a projection, so that the whole body of the clamper is elastically biased via the projection by the depressed portion formed to the leaf spring. Therefore, appropriate load can constantly be applied to the disk being sandwiched between the turntable and the clamper.

A sixth aspect of the present invention relates to an electronic device with a recording and/or reproducing apparatus having a turntable and a clamper holding a disk therebetween to write data into the disk or read data from the disk, the apparatus comprising a tray for mounting a disk, a frame for supporting the tray in a slidable manner, a turntable disposed on the frame for rotating the disk, and a clamper disposed on the frame so as to oppose to the turntable and enabled to move up and down, wherein the clamper further comprises an elastic body for biasing the clamper toward the turntable, at least one end of the elastic body being fixed to the frame and being supported on the frame in a cantilever form, and the frame further comprises a locking portion for preventing uplift of the elastic body.

According to the arrangement of aspect 6, the electronic device with a recording and/or reproducing apparatus has an elastic body and a fixing means for biasing the elastic means toward the clamper formed on the frame of the recording and/or reproducing apparatus, wherein one end of the elastic body is fixed and the other end is supported via a locking portion that prevents uplift of the elastic body, so that the disk sandwiched between the clamper and the turntable can be held with appropriate load by the clamper.

BRIEF DESCRIPTION OF THE DRAWINGS

FIG. 6 is a perspective view showing the structure for mounting components to the supporting portion, wherein FIG. 6(a) shows the state prior to mounting one end of the leaf spring to the supporting portion, FIG. 6(b) shows the state in which one end of the leaf spring is mounted to the supporting portion and prior to fixing the other end via a screw to the screw hole formed to the supporting portion, and FIG. 6(c) shows the state in which the mounting of the leaf spring to the supporting portion is completed;

DETAILED DESCRIPTION OF THE PREFERRED EMBODIMENTS

Now, a first preferred embodiment for carrying out the present invention will be described with reference to FIGS. 1 through 6. In the present embodiment, a television receiver with a built-in DVD player is exemplified as the electronic device with a recording and/or reproducing apparatus, but obviously, the present invention can be applied to arrangements other than those illustrated in the embodiments within the scope of the present invention.

Embodiment 1

Figure 1:
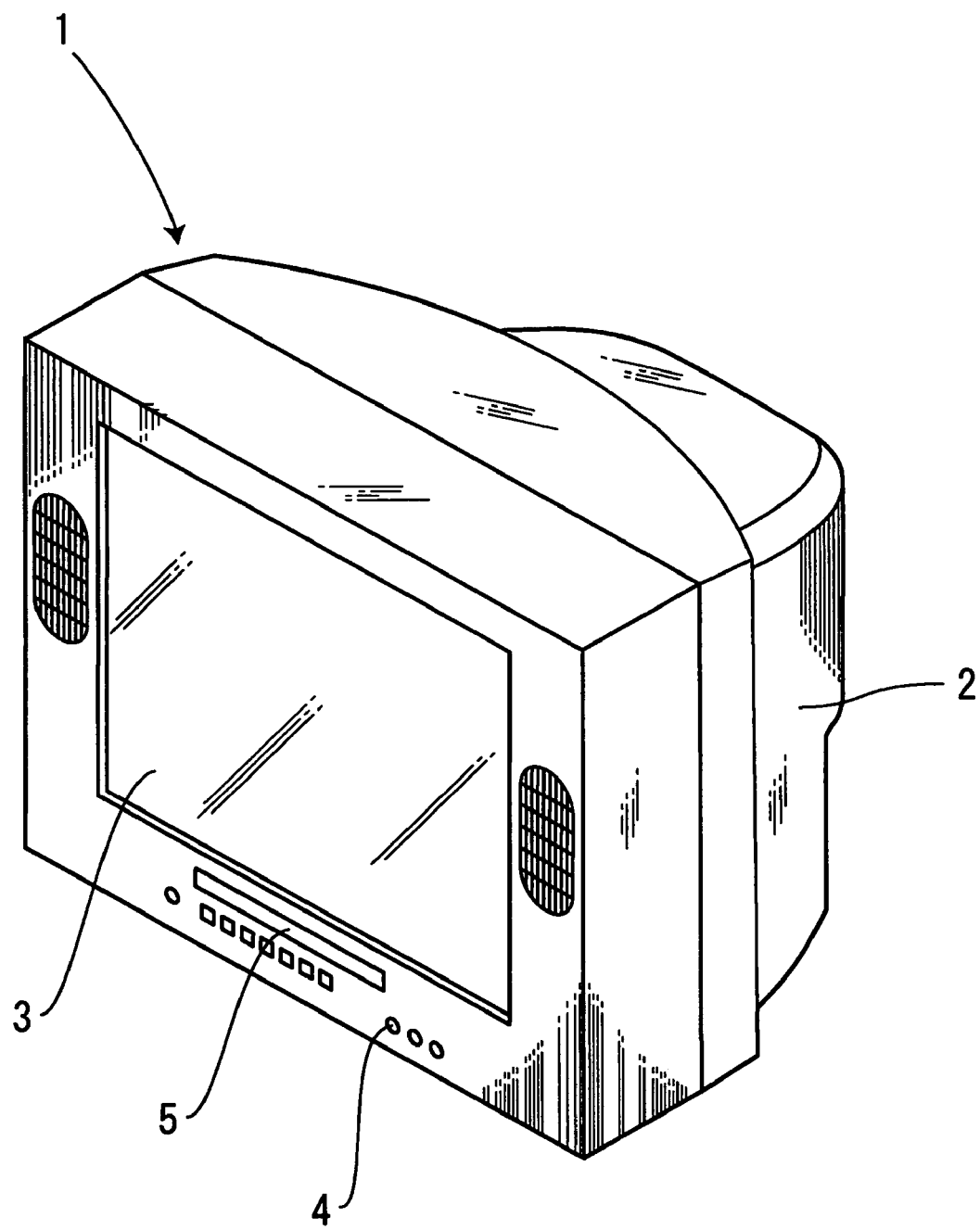
FIG. 1 is a perspective view of an electronic device according to a preferred embodiment of the present invention.

FIG. 1 is a perspective view showing an electronic device 1 according to the present invention, wherein the electronic device 1 comprises a substantially box-shaped cabinet 2 made of resin, and a display unit 3 for displaying images disposed on the center of the front side of the cabinet 2. Further, on the front side of the cabinet 2 are also provided jacks 4 for connecting the device with other devices and a disk loading/ejecting slot 5 through which a disk D mounted on a tray 21 is loaded into the device or ejected from of the device, wherein the tray 21 is designed to move in and out via a loading mechanism (not shown) disposed in the recording and/or reproducing apparatus (hereinafter simply referred to as recording and reproducing apparatus) 10.

Figure 2:
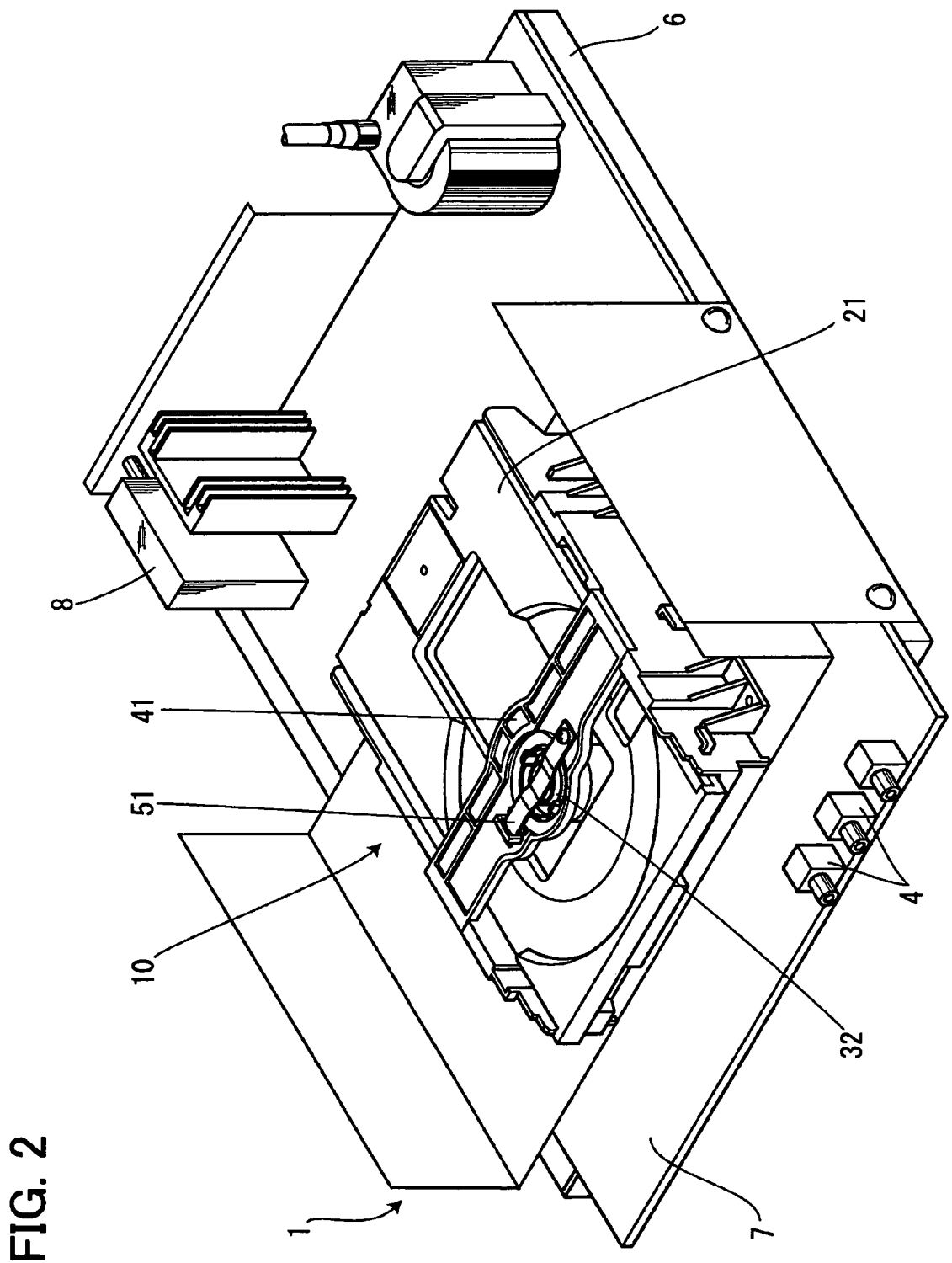
FIG. 2 is an exploded perspective view of the same according to embodiment 1.
Figure 3:
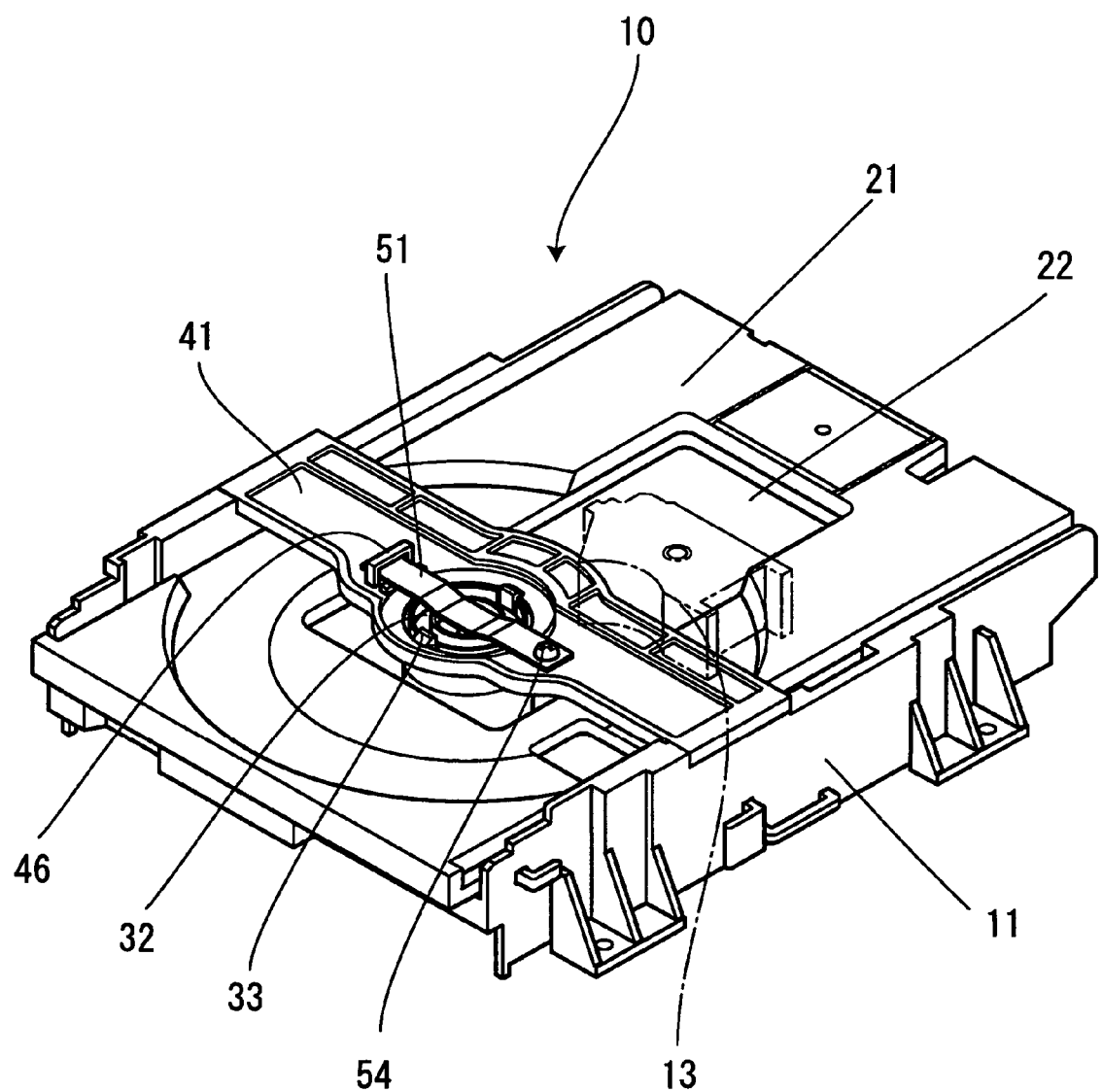
FIG. 3 is a perspective view showing the recording and reproducing apparatus according to embodiment 1.

FIG. 2 is a perspective view showing the inner structure of the electronic device 1, having a circuit board 7 arranged on a metallic chassis 6 on which the components of the electronic device 1 are assembled, and on the circuit board 7 are mounted an electronic component 8 including a tuner, jacks 4, and a recording and reproducing apparatus 10.

Figure 6:
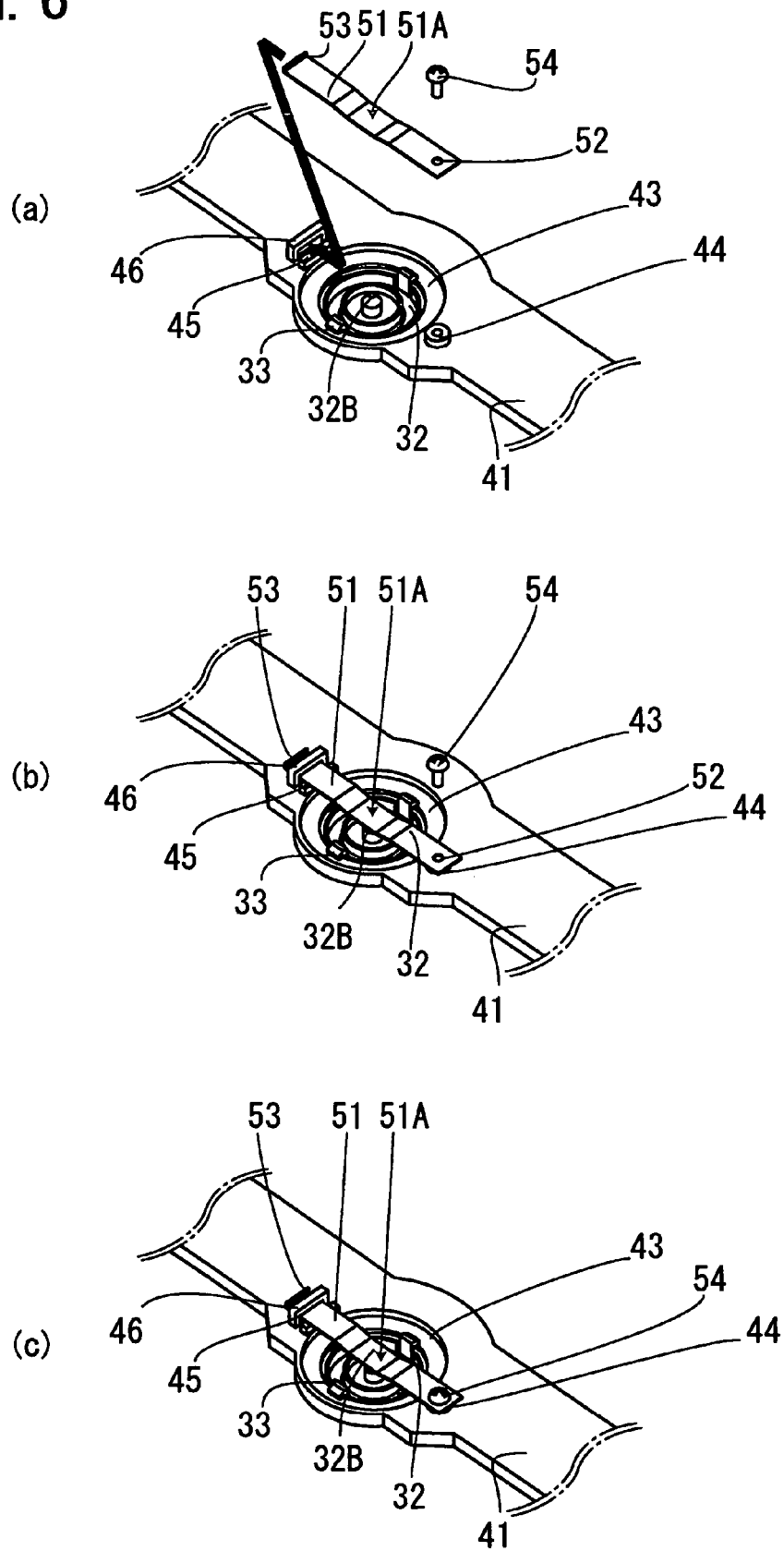
Figure 7:
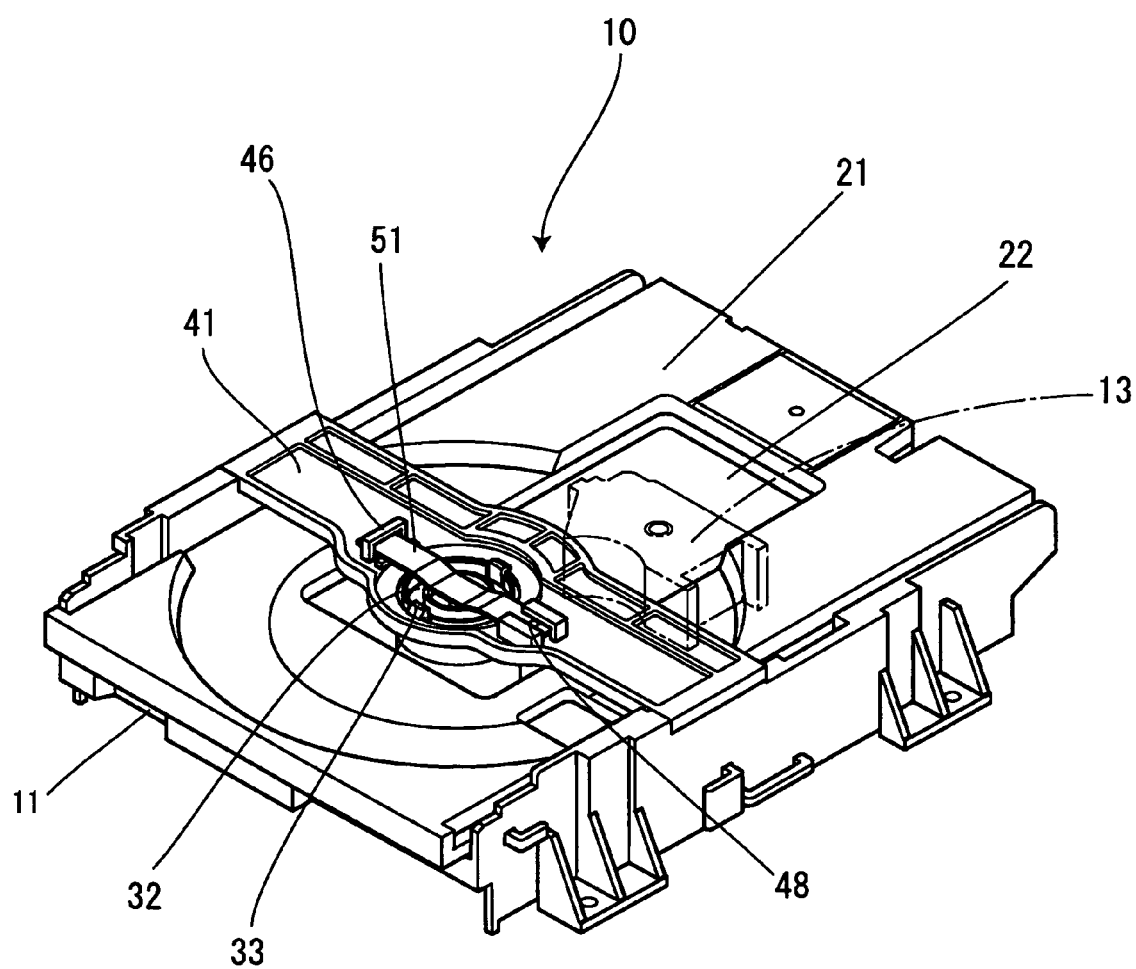
FIG. 7 is a perspective view showing the recording and reproducing apparatus according to embodiment 2 of the present invention.
Figure 8:
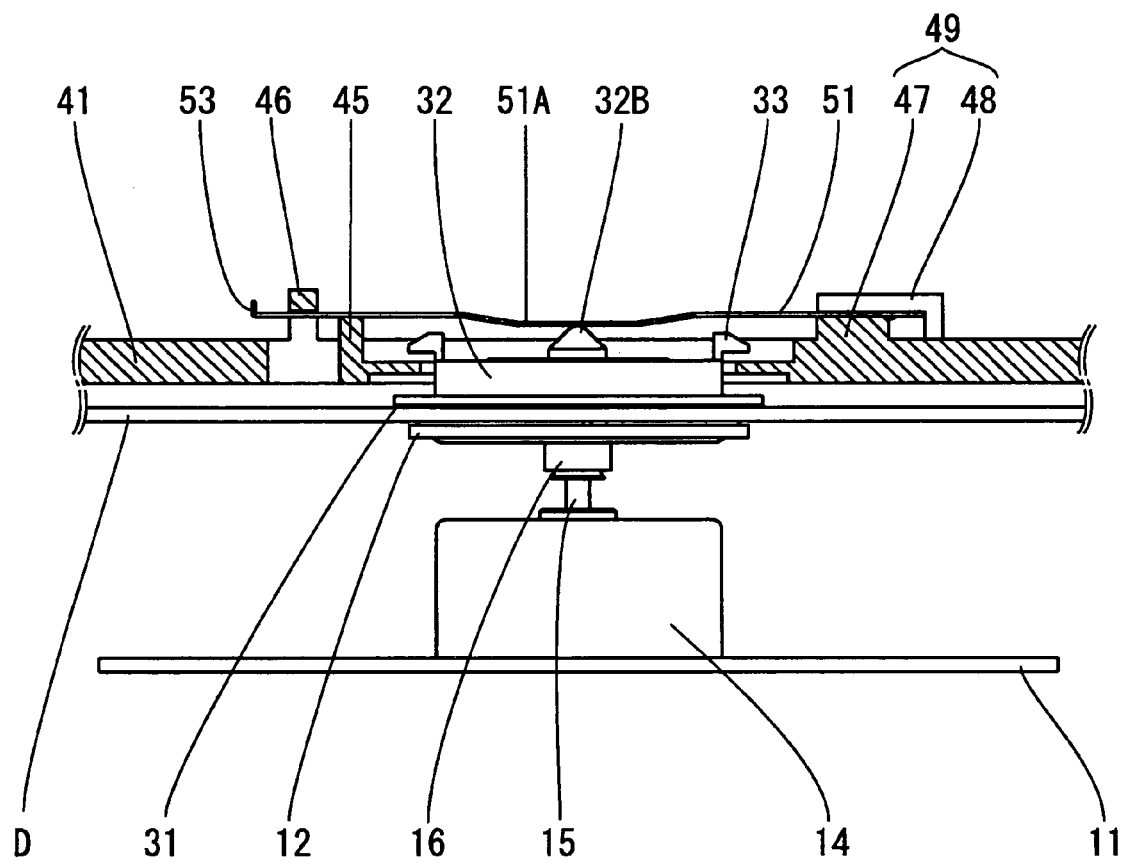
FIG. 8 is a cross-sectional view showing the clamper portion of the recording and reproducing apparatus according to embodiment 2.
Figure 9:
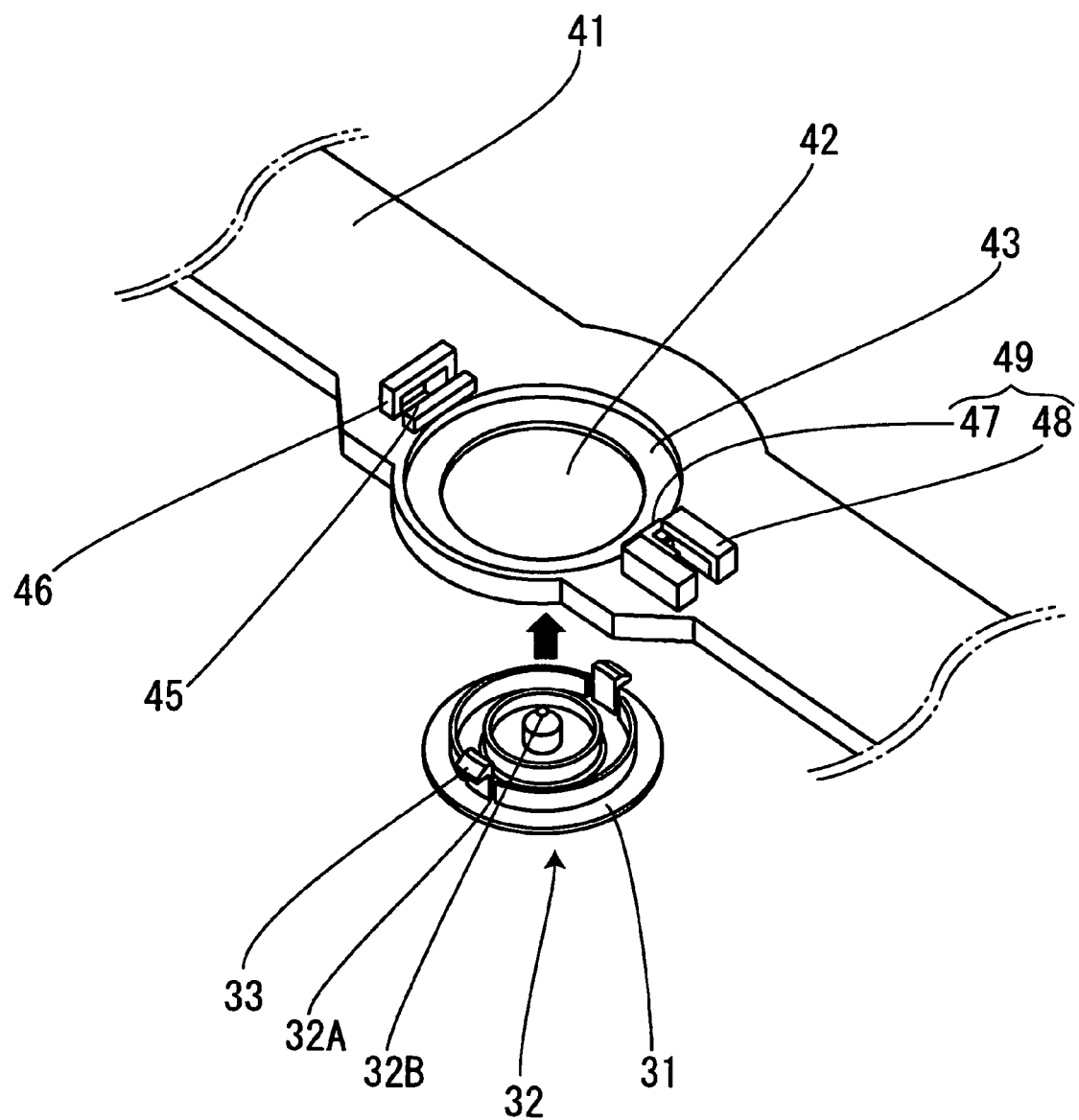
FIG. 9 is an exploded perspective view showing the supporting portion of embodiment 2.
Figure 10:
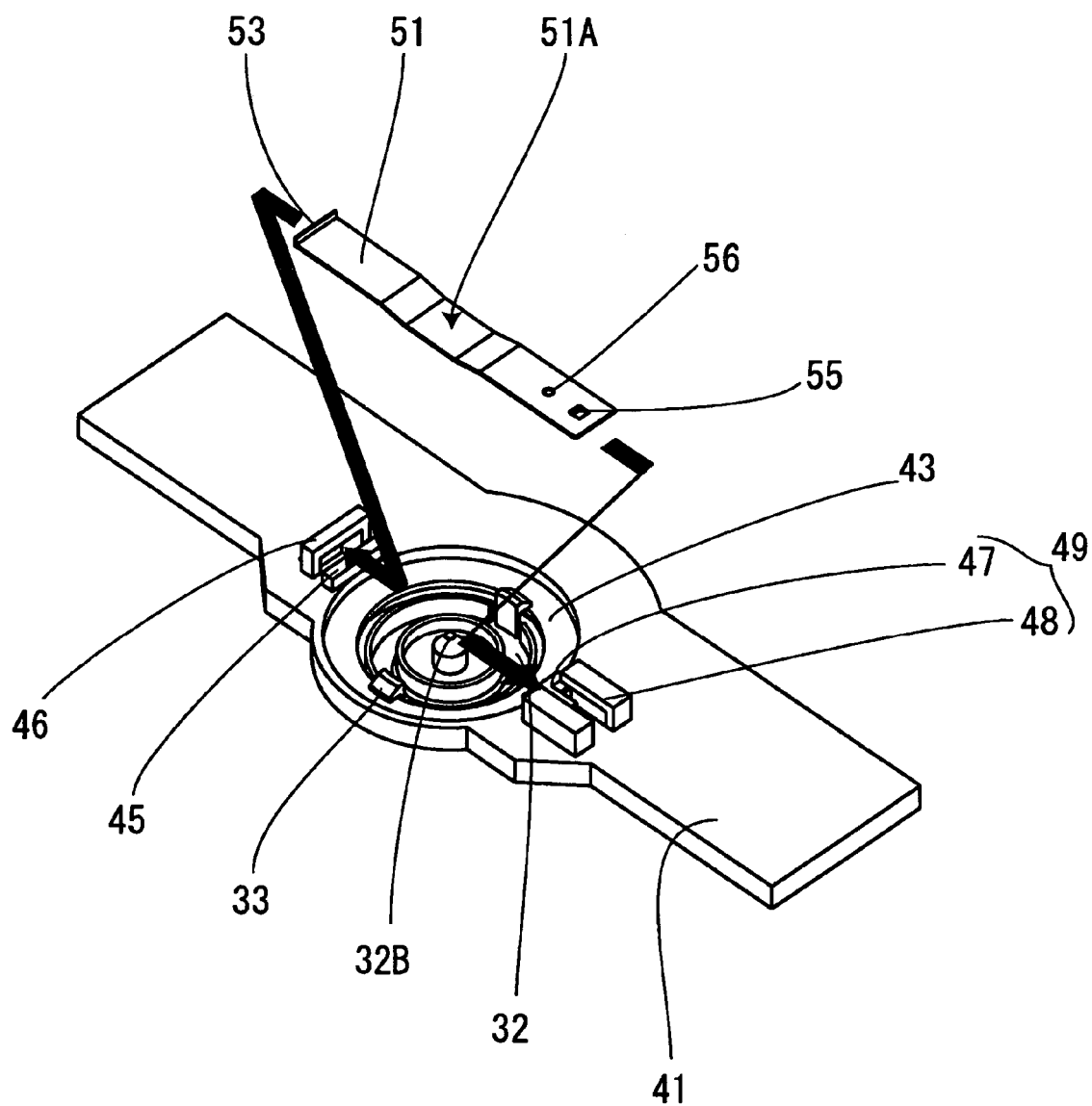
FIG. 10 is a perspective view showing the structure for mounting components to the supporting portion.

Next, the details of the mounting structure of the recording and reproducing apparatus 10 and a leaf spring 51 will be described with reference to FIGS. 3 through 6. The recording and reproducing apparatus 10 has a frame 11 made of resin, and on the frame 11 are disposed a turntable 12 for mounting the disk D and an optical pickup 13 for writing data on the disk D or reading data from the disk D. Further, a tray 21 capable of moving in sliding motion via a loading mechanism is assembled to the frame 11, and the tray 21 is provided with a hole portion 22 for writing data on the disk D or reading data from the disk D via the optical pickup 13. Moreover, an opening 42 is formed on a strip-shaped supporting portion 41 formed to the frame 11 at a position opposing to the turntable 12, and a clamper 32 is inserted to the opening 42. The clamper 32 has a flange portion 31 formed to the lower edge thereof having a larger diameter than the opening 42 and a pair of hook portions 33 that deform elastically in the radial direction via slots 32A formed to the outer circumference of the clamper 32. By engaging the hook portions 33 to a stepped recess portion 43 formed to the upper circumference of the opening 42, the clamper 32 is assembled to the opening 42 so as to be able to rotate and also move up and down. The clamper 32 is an integrally molded product made of resin, having at the center thereof a hemispherical projection 32B, and a leaf spring 51 being an elastic body is pressed against the projection 32B so as to restrict the uplift of the clamper 32. The leaf spring 51 is a strip-shaped thin plate, having at the substantial center area thereof an inverse trapezoidal depressed portion 51A formed via bending for pressing the projection 32B, and a substantially L-shaped bent portion 53 is formed to one end of the leaf spring 51. On the supporting portion 41 of the frame 11 for fixing the leaf spring 51 are provided a screw hole 44 for fixing the screw 54 as fixing means, a stopper 45 for supporting the other end of the leaf spring 51 as a stopper portion for suppressing the uplift of one end of the leaf spring 51, and a substantially angular U-shaped retention frame 46 to which the other end of the leaf spring 51 is inserted. Upon assembling the leaf spring 51 to the supporting portion 41, at first, the end of the leaf spring 51 having the bent portion 53 is inserted to the retention frame 46 as illustrated in FIG. 6(a), and then the other end is fixed via a screw 54 as illustrated in FIG. 6(b). Thus, as illustrated in FIG. 6(c), one end of the leaf spring 51 is supported in the form of a cantilever by the supporting portion 41 via a screw 54 engaged to the screw hole 44, and the other end of the leaf spring 51 is maintained at its position by the stopper 45 and the retention frame 46. Thus, the inverse trapezoidal depressed portion 51A formed at the center of the leaf spring 51 fixed to the supporting portion 41 presses the projection 32B of the clamper 32 to thereby prevent uplift of the clamper 32. Further, a bent portion 53 is formed to the other end of the leaf spring 51 to prevent the end from escaping from the retention frame 46.

Figure 4:
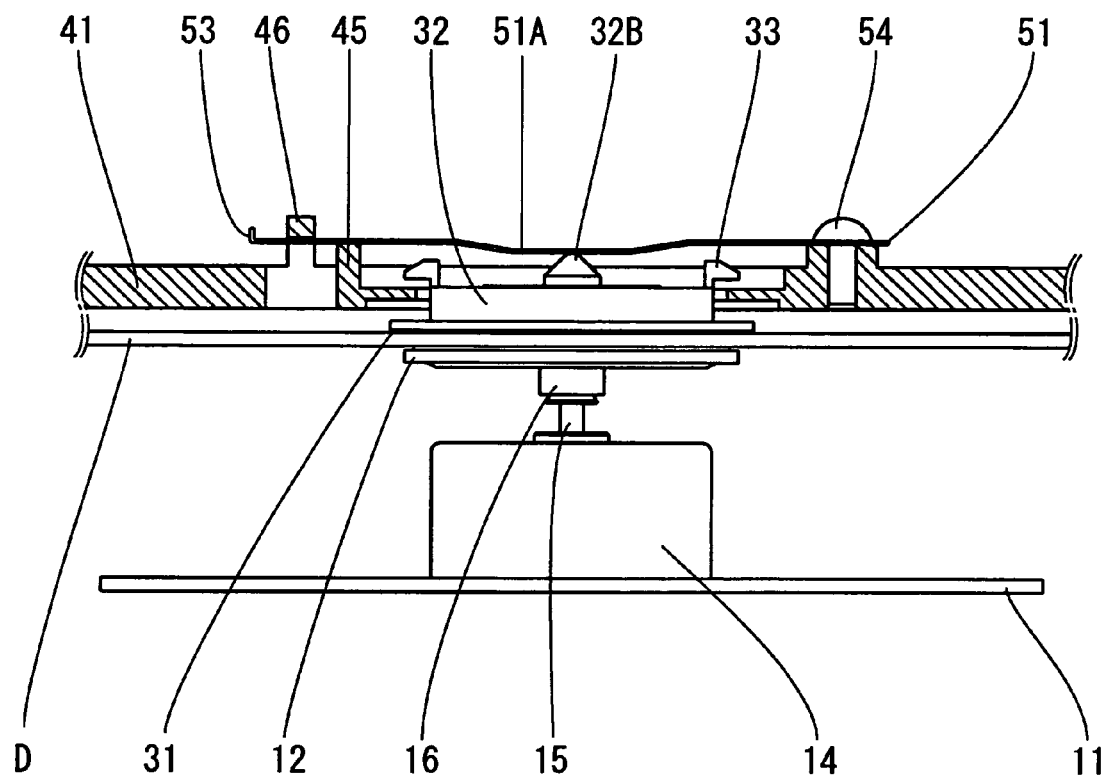
FIG. 4 is a cross-sectional view showing a clamper portion of the recording and reproducing apparatus according to embodiment 1.
Figure 5:
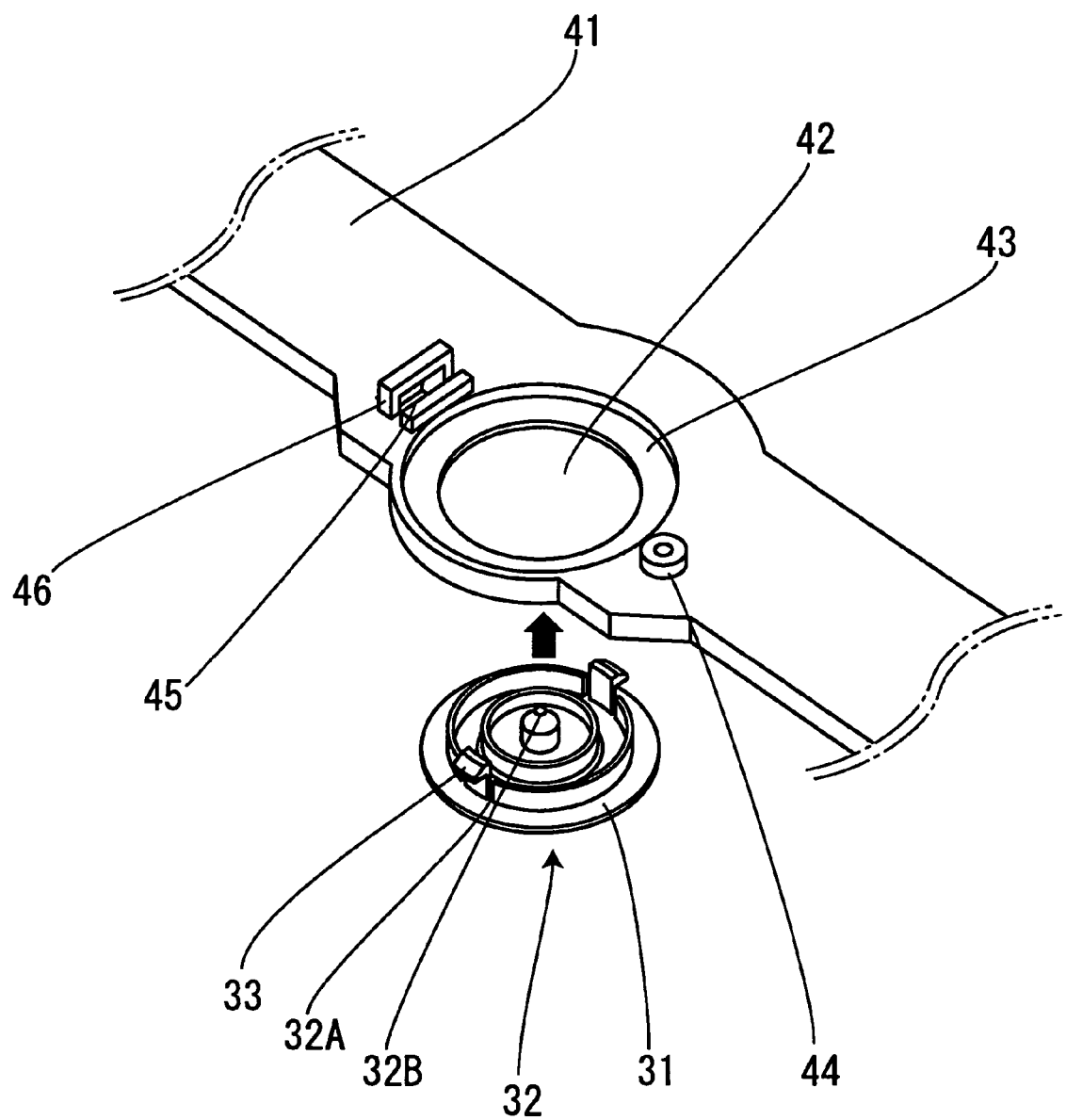
FIG. 5 is an exploded perspective view showing the supporting portion according to embodiment 1.

The present invention having the arrangement described above is designed to clamp the disk D by the turntable 12 and the clamper 32 when recording or reproducing data on the disk D, as illustrated in FIG. 4, by mounting the disk D on a tray 21 and loading the same into the recording and reproducing apparatus 10, moving a turntable 12 connected via a cylindrical portion 16 to a rotary shaft 15 of a spindle motor 14 assembled to the frame 11 upward from the lower side of the disk D to fit into the center hole of the disk D, and having the clamper 32 biased downward by the leaf spring 51 provided on the supporting portion 41 elastically contact the disk D from the upper side. At this time, the axis is aligned at the center hole of the disk D, the disk D is driven to rotate integrally with the turntable 12 and the clamper 32 via the spindle motor 14, and the optical pickup 13 assembled to the frame 11 is moved in the radial direction of the disk D so as to record or reproduce data on the disk. At this time, in order to bias the clamper 32 with appropriate force toward the disk D, a leaf spring 51 is disposed on the supporting portion 41 and a depressed portion 51A being formed one step lower than the other portions is formed in an inverse trapezoidal shape at the center of the leaf spring 51 to thereby constantly elastically contact the projection 32B formed to the clamper 32, so that applying appropriate load is applied constantly to the clamper 32. According to the arrangement in which a screw hole 52 is formed to one end of the leaf spring 51, a bent portion 53 is formed to the other end thereof, and the supporting portion 41 is provided with a screw hole 44 for fixing the leaf spring 51 provided near the stepped recess portion 43 of the supporting portion 41, a stopper 45 and a substantially angular U-shaped retention frame 46 formed to the opposing position, one end of the leaf spring 51 is fixed via a screw while the other end is attached with a clearance, so that the movement of the leaf spring 51 accompanying the vertical movement of the clamper 32 while the disk D is clamped and rotated can be restricted, and the contact noise occurring between the leaf spring 51 and the supporting portion 41 can be suppressed.

As disclosed, according to the present embodiment, the center portion of the leaf spring 51 is formed one step lower in a trapezoidal shape, with a screw hole 52 formed to one end and a bent portion 53 formed to the other end, and a supporting portion 41 to which the leaf spring 51 is disposed has a screw hole 44, a stopper 45 having substantially the same height as the screw hole 44 positioned opposing thereto and a substantially angular U-shaped retention frame 46 positioned near the stopper 45, so that the end with the bent portion 53 of the leaf spring 51 can be inserted to the retention frame 46 and then the other end to which the screw hole 52 of the leaf spring 51 is formed can be screw-engaged to the screw hole 44 of the supporting portion 41. According to this arrangement, the depressed portion 51A of the leaf spring 51 and the projection 32B being formed to project from the clamper 32 disposed in the opening 42 of the supporting portion 41 can contact each other elastically without fail, so that the disk D can be clamped and rotated with appropriate load constantly applied thereto during recording or reproducing, by which the vibration resistance performance is enhanced. Moreover, since the movement of the leaf spring 51 accompanying the vertical movement the clamper 32 during rotation can be restricted by clamping the same with appropriate load, the contact noise generated between the leaf spring 51 and the supporting portion 41 can be reduced. Further, since the bent portion 53 of the leaf spring 51 is engaged to the retention frame 46, the leaf spring 51 is prevented from being disengaged and releasing the clamped condition even when the vibration increases, so the quality of the apparatus is improved. Moreover, since the disk D can be clamped constantly in the most preferable condition merely by the biasing force of the leaf spring 51, and since there is no need to provide magnetic bodies which are relatively expensive components to the turntable 12 and the clamper 32, the cost of the components can be cut down.

Moreover, since the leaf spring 51 can be assembled easily to the supporting portion 41, the operation process can be simplified.

Embodiment 2

FIGS. 7 through 10 illustrate a second embodiment of the present invention, wherein the parts having the same functions as those of embodiment 1 are denoted with the same reference numbers and the descriptions thereof are omitted, so that only the different points are described in detail. In the present embodiment, a screw 54 is not used as a means for fixing one of the end of the leaf spring 51, and instead, a portion near the end of the leaf spring 51 is cut and raised in the lower direction to form a locking claw 55 thereby, which is fixed to a second retention portion 49 composed of a protruded portion 47 and a position restricting rib 48 formed on the supporting portion 41. The protruded portion 47 is formed in the shape of a T having substantially the same height as the stopper 45, and on both sides thereof are substantially L-shaped position restricting ribs 48 having substantially the same height as the retention frame 46, with a clearance formed between the protruded portion 47 and the position restricting ribs 48.

When mounting the leaf spring 51 to the supporting portion 41, at first, one end of the leaf spring 51 having the bent portion 53 formed thereto is inserted to the retention frame 46 of the supporting portion 41, and thereafter, the other end of the leaf spring 51 on which the locking claw 55 is formed is inserted to the clearance formed between the protruded portion 47 and the position restricting ribs 48 of the supporting portion 41, and by inserting the locking claw 55 until it reaches a position where it is stopped by the protruded portion 47, the mounting of the leaf spring 51 to the supporting portion 41 is completed. Further, a through hole 56 is formed near the locking claw 55 of the leaf spring 51. This is formed in consideration of the workability of the worker performing the actual mounting operation of the leaf spring 51 to the supporting portion 41, so that especially when inserting the other end of the leaf spring 51 on which the locking claw 55 is formed to the second retention portion 49, the inserting operation can be facilitated by inserting a rod-like jig to the through hole 56 when inserting the other end of the leaf spring 51 to the clearance formed between the protruded portion 47 and the position restricting ribs 48 of the second retention portion 49.

According to the present embodiment having the arrangement described above, similar to embodiment 1, the disk D is supported in a state being clamped by the turntable 12 and the clamper 32, and when power is supplied, the disk D is driven to rotate so as to record or reproduce data. At this time, the present arrangement has a leaf spring 51 with an inverse trapezoidal depressed portion 51A which is formed somewhat lower at the center than the other areas on the supporting portion 41 for appropriately biasing the clamper 32 toward the disk D, wherein the leaf spring is disposed so as to constantly elastically contact the projection 32B formed to the clamper 32. On one end of the leaf spring 51 is a locking claw 55 formed by cutting and raising a portion of the leaf spring 51 in the lower direction, and on the other end thereof is formed a bent portion 53. Near the stepped recess portion 43 of the supporting portion 41 is formed a second supporting portion 49 composed of a T-shaped protruded portion 47 and position restricting ribs 48 for fixing the leaf spring 51, and on the opposing position thereof is formed a stopper 45 and a substantially angular U-shaped retention frame 46. By passing one end of the leaf spring 51 having the bent portion 53 through the retention frame 46 of the supporting portion 41 and the other end of the leaf spring 51 having the locking claw 55 passed through the clearance formed between the protruded portion 47 of the supporting portion 41 and the position restricting ribs 48, the one end of the leaf spring 51 can be passed through and fixed to the retention frame 46 of the supporting portion 41 while the other end of the leaf spring 51 has the locking claw 55 locked to the second retention portion 49. Thereby, the leaf spring 51 can apply an appropriate load to the clamper 32, so that the movement of the leaf spring 51 accompanying the vertical movement of the clamper 32 when the disk D clamped by the turntable 12 and the clamper 32 is driven to rotate can be restricted, and the contact noise generated at this time between the leaf spring 51 and the supporting portion 41 can also be suppressed.

As described, according to the present embodiment, the leaf spring 51 has at the center portion thereof a trapezoidal depressed portion 51A which is formed one step lower than the other areas, a locking claw 55 at one end thereof, and a bent portion 53 at the other end thereof, whereas the supporting portion 41 supporting the leaf spring 51 has a second retention portion 49 composed of a protruded portion 47 and position restricting ribs 48, a stopper 45 opposed to the second retention portion 49 and having substantially the same height as the protruded portion 47, with a substantially U-shaped retention frame 46 disposed close to the protruded portion, so that the leaf spring 51 can elastically contact without fail the projection 32B which is a projected end formed to the clamper 32 provided in the opening 42. Moreover, since a bent portion 53 is formed to one end of the leaf spring 51 that is passed through the retention frame 46, the panel spring 51 will not be displaced even if vibration is increased, and the disk D can be clamped and rotated for recording or reproducing data with appropriate load applied constantly thereto, so the vibration resisting performance of the device is improved. Even further, since the present arrangement limits the movement of the leaf spring 51 accompanying the movement of the clamper 32 in the vertical direction, the contact noise generated between the leaf spring 51 and the supporting portion 41 can be reduced, and thus, the quality of the device is improved. Moreover, since there is no need to assemble any additional engagement member such as a screw 54, the present arrangement enables to reduce component costs and simplify the manufacturing processes.

An electronic device 1 with a recording and reproducing apparatus 10 including a loading tray has been described in the preferred embodiments of the present invention, but the present invention can also be applied to a slot-in type electronic device 1 capable of having the disk loaded directly into the recording and reproducing apparatus 10, or to an electronic device 1 with a recording and reproducing apparatus 10 having a disk changer for loading multiple disks into the apparatus 10. Moreover, the present invention can also be applied to a portable recording and reproducing apparatus 10 having the clamper 32 disposed on an inner side of an opening/closing lid.

The effects of the present invention are as follows.

The first aspect of the present invention provides a recording and/or reproducing apparatus having a turntable and a clamper holding a disk therebetween to write data into the disk or read data from the disk comprises a tray for mounting a disk; a frame for supporting the tray in a slidable manner; a turntable disposed on the frame for rotating the disk; and a clamper disposed on the frame so as to oppose to the turntable and enabled to move up and down; wherein the clamper further comprises an elastic body for biasing the clamper toward the turntable, at least one end of the elastic body being fixed to the frame and being supported on the frame in a cantilever form; and the frame further comprises a locking portion for preventing uplift of the elastic body. According to the present arrangement, the disk held between the turntable and the clamper can be driven to rotate while having appropriate load applied constantly thereto from the clamper, so that the vibration resistance of the apparatus is improved, and since the movement of the leaf spring caused by the vertical movement of the clamper during rotation can be restricted, the contact noise generated between the leaf spring and the frame can be reduced, and the quality of the apparatus is thus improved.

According to the second aspect of the present invention, the recording and/or reproducing apparatus according to aspect 1 characterizes in that the elastic body is composed of a leaf spring having one end thereof fixed to the frame via a fixing means, the frame further comprising as the locking portion a retention frame for preventing uplift of the leaf spring by having the other end of the leaf spring inserted thereto and a stopper for supporting said other end of the leaf spring. According to the present arrangement, the disk can be held between the clamper and the turntable with appropriate biasing force applied to the clamper being elastically in contact with the leaf spring, so the movement of the leaf spring caused by the vibration of the disk is restricted, and the contact noise generated between the leaf spring and the frame can be reduced.

According to the third aspect of the present invention providing a recording and/or reproducing apparatus according to aspects 1 or 2, wherein the fixing means is composed of a screw and the frame has a screw hole for receiving the screw, one end of the leaf spring can be fixed securely to the frame without the need for positioning the leaf spring, so the manufacturing processes of the apparatus can be simplified.

According to the fourth aspect of the present invention providing a recording and/or reproducing apparatus according to aspects 1 or 2, wherein the fixing means is composed of a protruded portion and a position restricting rib formed to the frame, having one end of the leaf spring inserted to a groove portion formed between the protruded portion and the position restricting rib, and wherein the leaf spring further has a locking claw that restricts the spring from escaping from the groove portion, one end of the leaf spring can be inserted to the retention frame until it reaches a position where the locking claw is locked onto the protruded portion, so the leaf spring can be easily assembled onto the frame. According to the present arrangement, the work efficiency for assembling the apparatus is enhanced, and the component costs of the apparatus can be cut down since there is no need to provide a separate component for fixing the leaf spring to the frame.

The fifth aspect of the present invention provides a recording and/or reproducing apparatus according to any one of aspects 2 through 4, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection. According to the present arrangement, the clamper can be biased via the projection without fail, so that appropriate load is constantly applied to the disk being held between the turntable and the clamper. According to the present arrangement, the vibration resisting performance of the apparatus can be enhanced.

The sixth aspect of the present invention provides an electronic device with a recording and/or reproducing apparatus having a turntable and a clamper holding a disk therebetween to write data into the disk or read data from the disk, the apparatus comprising a tray for mounting a disk, a frame for supporting the tray in a slidable manner, a turntable disposed on the frame for rotating the disk, and a clamper disposed on the frame so as to oppose to the turntable and enabled to move up and down, wherein the clamper further comprises an elastic body for biasing the clamper toward the turntable, at least one end of the elastic body being fixed to the frame and being supported on the frame in a cantilever form, and the frame further comprises a locking portion for preventing uplift of the elastic body. According to the present arrangement, the disk held between the clamper and the turntable can have appropriate load applied thereto by the clamper, so the vibration resisting performance and other qualities of the electronic device are improved.

What is claimed is:

1. A recording and/or reproducing apparatus having a turntable and a clamper holding a disk therebetween to write data into the disk or read data from the disk, the apparatus comprising:
   a tray for mounting a disk;
   a frame for supporting the tray in a slidable manner;
   a turntable disposed on the frame for rotating the disk; and
   a clamper disposed on the frame so as to oppose to the turntable and enabled to move up and down; wherein
   the clamper further comprises an elastic body for biasing the clamper toward the turntable, at least one end of the elastic body being fixed to the frame and being supported on the frame in a cantilever form,
   the elastic body comprises a leaf spring having a first end fixed to the frame via a fixing means, and
   the frame comprises a retention frame for suppressing uplift of the leaf spring by having a second end of the leaf spring inserted thereto and a stopper for supporting said second end of the leaf spring.

2. The recording and/or reproducing apparatus according to claim 1, wherein the fixing means is composed of a screw, and the frame has a screw hole for receiving the screw.

3. The recording and/or reproducing apparatus according to claim 2, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection.

4. The recording and/or reproducing apparatus according to claim 1, wherein the fixing means is composed of a protruded portion and a position restricting rib formed to the frame, having one end of the leaf spring inserted to a groove portion formed between the protruded portion and the position restricting rib, and wherein the leaf spring further has a locking claw that restricts the spring from escaping from the groove portion.

5. The recording and/or reproducing apparatus according to claim 4, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection.

6. The recording and/or reproducing apparatus according to claim 1, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection.

7. The recording and/or reproducing apparatus according to claim 1, wherein the fixing means is composed of a screw, and the frame has a screw hole for receiving the screw.

8. The recording and/or reproducing apparatus according to claim 7, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection.

9. The recording and/or reproducing apparatus according to claim 1, wherein the fixing means is composed of a protruded portion and a position restricting rib formed to the frame, having one end of the leaf spring inserted to a groove portion formed between the protruded portion and the position restricting rib, and wherein the leaf spring further has a locking claw that restricts the spring from escaping from the groove portion.

10. The recording and/or reproducing apparatus according to claim 9, wherein the frame has an opening enabling the clamper to be passed therethrough in a manner so as to be able to move up and down, the clamper having a flange portion and a hook portion that are greater in diameter than the opening, the clamper being supported so as to be able to move up and down by the flange portion and the hook portion, the clamper further having a projection protruded upward from the center portion thereof, and the leaf spring having formed thereto via bending a depressed portion for pressing the projection.

* * * * *